United States Patent [19]
Howell

[11] Patent Number: 4,609,839
[45] Date of Patent: Sep. 2, 1986

[54] NOISE INVERTER CIRCUIT FOR A POWER LINE COMMUNICATION SYSTEM

[75] Inventor: Edward K. Howell, Simsbury, Conn.

[73] Assignee: General Electric Company, Portsmouth, Va.

[21] Appl. No.: 656,804

[22] Filed: Oct. 1, 1984

[51] Int. Cl.⁴ .............................................. H03K 5/08
[52] U.S. Cl. .................................. 307/542; 307/549; 307/560; 328/171
[58] Field of Search ............... 307/540, 542, 549, 551, 307/555, 560, 567; 328/54, 168, 169, 171, 172, 173; 340/310 A

[56] References Cited
U.S. PATENT DOCUMENTS 2,863,123  12/1958  Koch .................................. 307/567
3,541,459  11/1970  Webb .................................. 307/542

Primary Examiner—John Zazworsky

[57] ABSTRACT

A noise inverter circuit substantially reduces the effects of noise generated within power lines operating as a communication media. Input noise signals are clipped to reduce the noise wave amplitude and the peak amplitude is inverted to a value less than the signal amplitude. By limiting the positive rate of change of peak signal amplitude, the prevailing signal level is averaged over a longer time base than the duration of the noise wave.

7 Claims, 5 Drawing Figures

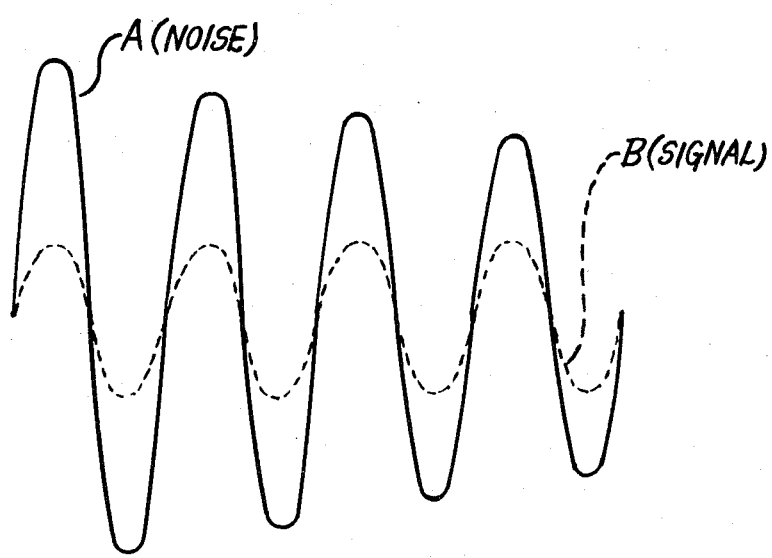
Fig.1. A (NOISE) B (SIGNAL)
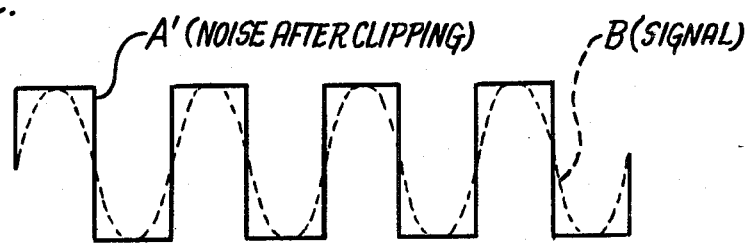
Fig.2. A' (NOISE AFTER CLIPPING) B (SIGNAL)
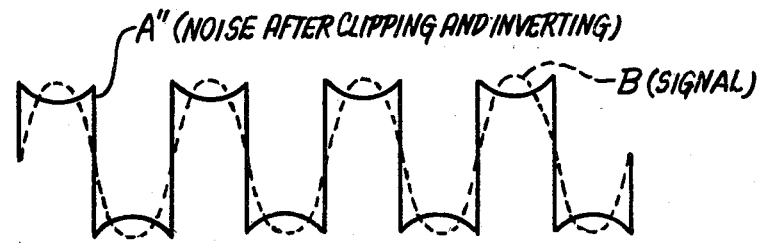
Fig.3. A" (NOISE AFTER CLIPPING AND INVERTING) B (SIGNAL)

NOISE INVERTER CIRCUIT FOR A POWER LINE COMMUNICATION SYSTEM

BACKGROUND OF THE INVENTION

Power line communication systems are employed for carrying signals between transmitters and receivers interconnected by means of the line and neutral conductors. Since the line conductor continuously carries current, noise is occasionally generated by sudden interruptions in current caused by various switching devices.

U.S. Pat. No. 4,433,326 and U.S. Pat. No. 4,408,186 describe power line communication systems wherein signals are generated between the neutral and ground conductors. Since the neutral conductor is a continuous current carrier, some noise is generated which could interfere with the communication signals. The complex nature of the noise waveform requires sophisticated filter circuits to reduce the noise amplitude to below the level of the signal amplitude.

The purpose of this invention is to provide a noise inverter circuit for reducing the noise amplitude as well as providing automatic tracking of the threshold for noise inversion to the prevailing signal level.

SUMMARY OF THE INVENTION

A noise inverter circuit dynamically inverts the peaks of the signal waveform which includes noise such that the amplitude of the fundamental is equal to or less than the signal amplitude. A sudden increase in noise signal amplitude turns on a pair of transistors on alternate polarity peaks. The transistor current is increased to produce a corresponding reduction in the peak output voltage.

BRIEF DESCRIPTION OF THE DRAWINGS

FIG. 1 is a graphic representation of the signal and noise waveforms generated within a power line communication system;

FIG. 2 is a graphic representation of the waveforms depicted in FIG. 1 with the noise peak amplitude clipped to a level equal to signal amplitude;

FIG. 3 is a graphic representation of the waveforms depicted in FIG. 2 after inverting the clipped noise amplitude in accordance with the noise inversion circuit of the instant invention;

DESCRIPTION OF THE PREFERRED EMBODIMENT

FIG. 1 shows a characteristic signal waveform B when the information is in the form of a modulation of a higher frequency carrier signal. One such means of information transfer comprises amplitude shift keying (ASK) wherein digital data is derived from a 100% amplitude modulated carrier signal. When employed for communication over power systems, a typical carrier frequency of 150 KHZ is usually employed. As described in the aforementioned U.S. patents, which are incorporated herein for purposes of reference, impulse type noise such as that shown at A in FIG. 1 is created by both mechanical and solid state switches. Noise waveform A is typically a damped sinusoid having a much larger amplitude than carrier signal B and may also have a ringing frequency within the passband of the receiver filters. A typical parallel resonant receiver filter, when subjected to a ringing noise waveform such as A, greater than signal waveform B, and at the same frequency, produces a ringing output waveform larger than B having an exponential decay inversely related to the bandwidth of the receiver filter.

One means of reducing the amplitude of noise waveform A is to clip or limit the amplitude of the noise waves to equal the peak signal amplitude of signal waveform B. This is shown at A' in FIG. 2 wherein the amplitude of waveform A is clipped to a value approximately equal to that of the amplitude of signal waveform B. However, the amplitude of the fundamental frequency component of clipped noise waveform A' is still some 41% greater than a sine wave configuration having the same peak amplitude. This invention provides a technique for dynamically inverting the peaks of the limited waveform A' in such a manner that the amplitude of the fundamental frequency component is equal to or less than the amplitude of signal waveform B. FIG. 3 shows a resulting noise waveform A'' after clipping and inverting according to the technique of the instant invention compared to the signal waveform B.

Figure 4:
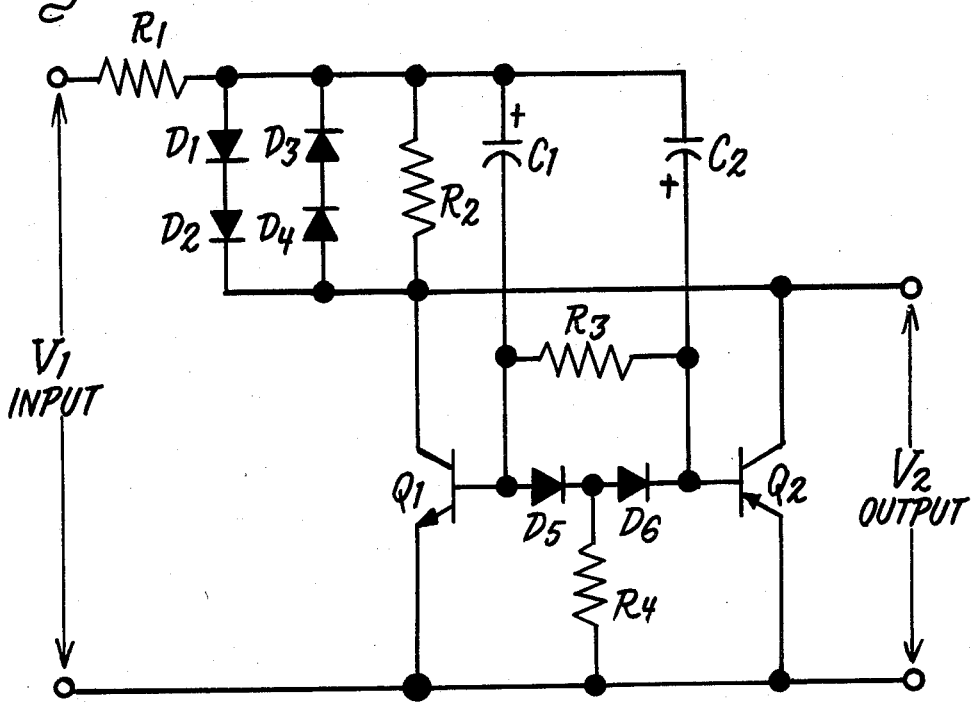
FIG. 4 is a circuit representation of a first embodiment of the noise inverter circuit according to the invention.

A noise inverter circuit 10 for providing the inverted noise waveforms A'' of FIG. 3 is shown in FIG. 4 and is designed for signal amplitudes in the order of one or two volts. An input voltage $V_1$ is derived from the power line within a residential or commercial building, as described within the aforementioned U.S. patent applications, for example, by capacitive coupling a receiver with the neutral and ground conductors. The voltage waveform appearing at voltage input $V_1$ is similar to that shown in FIG. 1. Capacitors $C_1$ and $C_2$ become charged to peak signal magnitude through diodes $D_5$, $D_6$ and resistor $R_4$ on alternate polarity peaks and are continually discharged through resistor $R_3$. A sudden increase in signal input, such as that depicted by the amplitude of noise waveform A in FIG. 1, results in a higher charging current increasing the voltage drop across resistor $R_4$ to turn on transistors $Q_1$, $Q_2$ on alternate polarity peaks. The collector currents of transistors $Q_1$, $Q_2$ flowing through $R_2$ reduce the peak output voltage appearing at $V_2$ and tend to limit the peak voltage applied to $C_1$ and $C_2$. At high peak signal voltage input at $V_1$, caused by the occurrence of noise, the voltage drop across $R_2$ permits conduction of diodes $D_1$, $D_2$ or $D_3$, $D_4$, thereby limiting the peak voltage applied to $C_1$ and $C_2$. In the arrangement shown in FIG. 4, resistor $R_1$ is connected with one of the input terminals and with the anode of $D_1$, the cathode of $D_3$, one side of resistor $R_2$ and with one side of each of the capacitors $C_1$ and $C_2$. The cathode of $D_1$ is connected in series with the anode of $D_2$ which is connected with the anode of $D_4$. The cathode of $D_4$ is connected in series with the anode of $D_3$. The other side of $R_2$ is connected with the collector of transistor $Q_1$ and the emitter of $Q_1$ is connected to the other input terminal. The base of $Q_1$ is connected with the anode of diode $D_5$, one side of resistor $R_3$ and the other side of capacitor $C_1$. The cathode of $D_5$ is connected through resistor $R_4$ to the emitters of $Q_1$ and $Q_2$, directly connected with the anode of diode $D_6$. The cathode of $D_6$ is connected with the other side of resistor $R_3$, the other side of capacitor $C_2$ and the base of transistor $Q_2$. The emitter of $Q_2$ is connected to one of the output terminals and the collector $Q_2$ is connected with the other output terminal.

Figure 5:
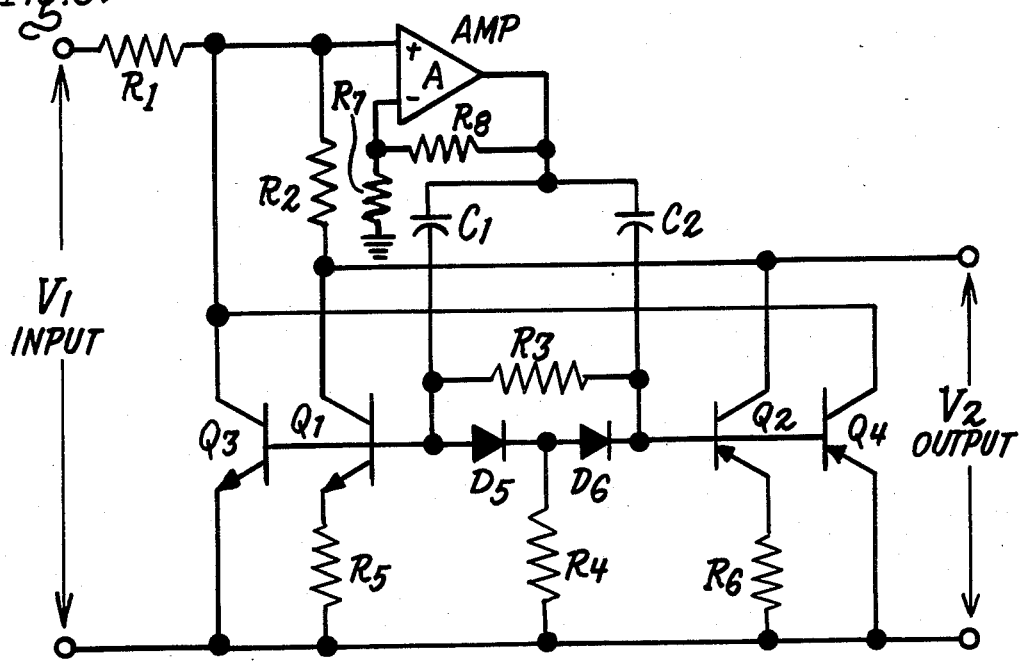
FIG. 5 is a second embodiment of the noise inverter circuit according to the invention.

The circuit 10 depicted in FIG. 5 is for lower information signal amplitudes than that of FIG. 4, typically in the 0.1 to 0.2 volt range. Similar circuit elements are employed and common reference numerals depict similar functions.

An operational amplifier, AMP, is employed to permit operation at lower levels. One side of $R_1$ is connected to one of the input terminals and the other side of $R_1$ is connected in common with the collectors of $Q_3$ and $Q_4$, one side of $R_2$ and to one input of the amplifier. The other input to the amplifier is connected to ground through $R_7$ and the output of the amplifier is connecter through $R_7$ and the output of the amplifier is connecter in common with one side of each of the capacitors $C_1$ and $C_2$ and to $R_7$ through $R_8$. Resistors $R_7$ and $R_8$ are used to define the voltage gain of the amplifier. The other side of capacitors $C_1$ and $C_2$ are connected together by means of resistor $R_3$. $C_1$ is connected to the anode of $D_5$ and $C_2$ is connected to the cathode of $D_6$. The cathode of $D_5$ is connected to the anode of $D_6$, and, through resistor $R_4$, to one side of each of the resistors $R_5$ and $R_6$ and to the emitters of $Q_3$ and $Q_4$. The other side of $R_5$ is connected to the emitter of $Q_1$ and the other side of $R_6$ is connected with the emitter of $Q_2$. The collector of $Q_2$ is connected with the other side of $R_2$ and with one of the output terminals. The other output terminal is connected in common with the emitters of $Q_4$ and $Q_3$, and with resistors $R_4$ and $R_6$. The circuit of FIG. 5 operates in a similar manner to that described earlier with reference to FIG. 4. The operational amplifier increases the signal magnitude prior to charging Capacitors $C_1$ and Capacitors $C_2$ to the prevailing peak signal magnitude through diodes $D_5$ and $D_6$. The transistors $Q_3$, $Q_4$ are provided to limit the charging voltage.

The circuits described in FIGS. 4 and 5 are especially effective for reducing noise in power line communication systems when the information signal is in digital form and amplitude shift keying is employed as a means of modulation. The circuits can be discrete circuit components connecting between the receivers and the power line as described earlier, or can be incorporated within the receiver circuit.

Having described my invention, what I claim as new and desire to secure by Letters Patent is:

1. A noise inverter circuit for a power line communication system comprising:
    first and second input terminals for receiving an alternating current electrical communication signal voltage which may include impulse noise;
    third and fourth output terminals for providing an output alternating current electrical communication signal voltage, said second input terminal and said fourth output terminal being connected in common;
    first and second oppositely polled capacitors each connected at one end thereof to said first input terminal;
    first and second diodes each having an anode and a cathode, the cathode of said first diode being connected to the other end of said first capacitor and the anode of said second diode being connected to the other end of said second capacitor;
    a first resistor connected at one end to the anode of said first diode and the cathode of said second diode and at the other end to the common connection of said second input terminal and the fourth output terminal, said first and second capacitors charging through said first and second diodes, respectively, and said first resistor to the prevailing peak signal voltage on alternate polarity peaks;
    a second resistor connected between said first and second capacitors to provide a discharge path therebetween;
    a third resistor connected between said first input terminal and said third output terminal for limiting the peak voltage across said first and second capacitors and reducing the peak output voltage across said third and fourth output terminals; and
    first and second transistors of opposite conductivity type each having a base, collector and emitter, the collectors of said first and second transistors being connected in common to said third output terminal, the emitters of said first and second transistors being connected to the common connection of said second input terminal and said fourth output terminal, the base of said first transistor being connected to the cathode of said first diode, and the base of said second transistor being connected to the anode of said second diode, whereby said first and second transistors are biased into conduction on alternate polarity peaks for signal voltages above a predetermined amplitude to thereby invert the peak amplitudes to a value less than the signal amplitude.

2. The noise inverter circuit of claim 1 including first and second diode strings for conducting current of opposite polarities and connected between said first input terminal and said third output terminal for further limiting the peak amplitude of the voltage across said first and second capacitors, said first and second diode strings conducting upon the occurrence of a predetermined level of input voltage.

3. The noise inverter of claim 1 further including a fourth resistor connected at one end to said first input terminal and at the other end to said third resistor and to said first and second resistors for limiting the current to said first and second transistors.

4. A noise inverter circuit for a power line communication system comprising:
    first and second input terminals for receiving an alternating current electrical communications signal voltage which may include impulse noise;
    third and fourth output terminals for providing an output alternating current electrcial communication signal voltage, said second input terminal and said fourth output terminal being connected in common;
    an amplifier having an input and an output, the input of said amplifier being connected to said first input terminal;
    first and second oppositely polled capacitors each connected at one end thereof to the output of said amplifier;
    first and second diodes each having and anode and a cathode, the cathode of said first diode being connected to the other end of said first capacitor and the anode of said second diode being connected to the other end of said second capacitor;
    a first resistor connected at one end to the anode of said first diode and the cathode of said second diode and at the other end to the common connection of said second input terminal and the fourth output terminal, said first and second capacitors charging through said first and second diodes, respectively, and said first resistor to the prevailing peak signal voltage on alternate polarity peaks;

a second resistor connected between said first and second capacitors to provide a discharge path therebetween;

a third resistor connected between said first input terminal and said third output terminal for limiting the peak voltage across said first and second capacitors and reducing the peak output voltage across said third and fourth output terminals;

first and second transistors of opposite conductivity type each having a base, collector and emitter, the collectors of said first and second transistors being connected in common to said first input terminal, the emitters of said first and second transistors being connected to the common connection of said second input terminal and said fourth output terminal; and third and fourth transistors of the same conductivity type as said first and second transistors, respectively, and each having a base, collector and emitter, the collectors of said third and fourth transistors being connected in common to said third output terminal, the emitters of said third and fourth transistors being connected to the common connection of said second input terminal and said fourth output terminal, the bases of said first and third transistors being connected in common to the cathode of said first diode, and the bases of said second and fourth transistors being connected in common to the anode of said second diode, whereby said first and third and said second and fourth transistors are biased into conduction on alternate polarity peaks for signal voltages above a predetermined amplitude to thereby invert the peak amplitudes to a value less than the signal amplitude.

5. The noise inverter of claim 4 wherein said amplifier is an operational amplifier.

6. The noise inverter of claim 3 further including fourth and fifth resistors connected between the emitters of said third and fourth transistors, respectively, and said common connection of said second input terminal and said fourth output terminal.

7. The noise inverter of claim 4 further comprising a sixth resistor connected between said first input terminal and the input to said amplifier.

* * * * *